Patented Feb. 9, 1932

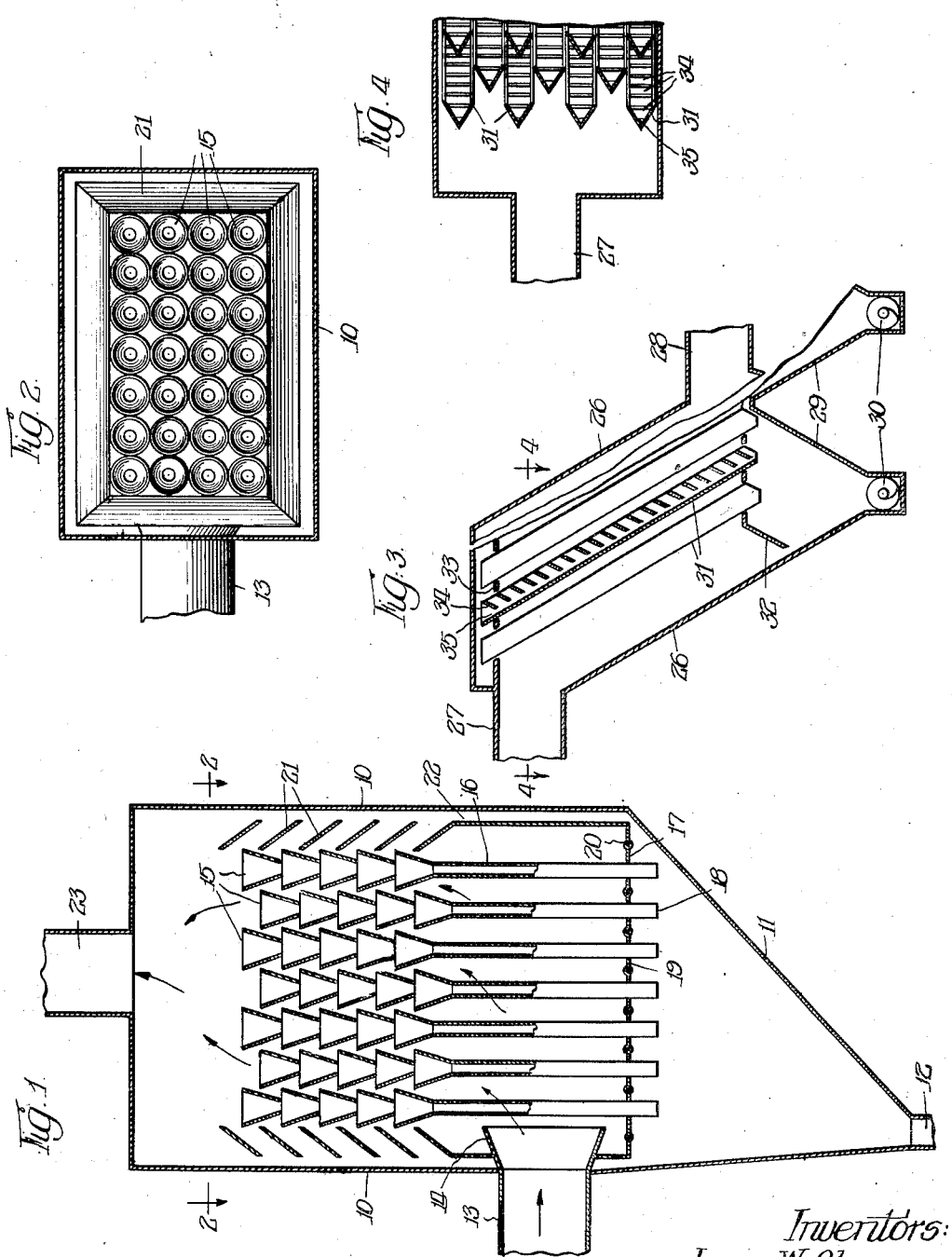

1,844,591

UNITED STATES PATENT OFFICE

LOUIS WILLIAM OLSON, OF CHESTERTON, AND MERLE ARTHUR KOLB, OF GARY, INDIANA

DUST COLLECTOR FOR CEMENT MILLS

Application filed August 9, 1929. Serial No. 384,776.

Our invention relates to dust collectors and more especially to dust collectors for cement mills and the like.

Our improved type of dust collector which the present invention describes, is for most general application to mills and factories such as flour mills, cement mills and similar ones in which a considerable quantity of dust fills the air and which must be removed to permit of satisfactory operating conditions for the employees. Many of the types of dust collectors now known and in use are unsatisfactory, in being able to remove only a portion of the dust from the air and gas and do so in an inefficient manner such as requiring the air to be passed through a succession of collectors.

It is an object of our invention to provide an improved type of dust collector in which the maximum amount of dust may be removed in a single passage of the air.

Another object of our invention is to provide a dust collector in which the dust may be removed from the collector without interrupting the dust collecting operation.

A further object is to provide a dust collector in which the dust can be removed from the collector continuously with the operation of the collector.

These and other objects and advantages will be more fully understood from the following specification, reference being had to the accompanying drawings, in which Fig. 1 is a cross sectional elevation of a dust collector embodying our invention.

Fig. 2 is a cross section of the same taken along the line 2—2 of Fig. 1.

Fig. 3 is a cross sectional elevation of a modification adapted for horizontal air flow, and Fig. 4 is a sectional view taken on the line 4—4 of Fig. 3.

It has been found by experiment that the passage of dustladen air upward around a series of funnels or similarly shaped deflectors or past angularly disposed vanes in the horizontal direction will result in certain circulatory or eddy currents in the air such that particles of dust or suspended matter in the air will be deposited within the funnels or at the base of the funnels or deflectors in considerable quantities.

Our invention incorporates the principles established by these tests as disclosed in the description which follows.

Referring to the drawings, we show in Figs. 1 and 2 the dust collector having sides 10, the bottom 11 of which is preferably sloping to form a hopper having an outlet 12. An entrance duct 13 leads into the collector through one of the sides 10 and preferably near the bottom of the same, and has a flaring terminal 14. A number of funnels or angular members 15 are secured within the collector by any suitable means and arranged in columns, the lower funnel of each column having a tubular portion 16 extending downwardly through the floor 17 of the container and terminating as at 18 within hopper 11. Floor 17, preferably comprises a series of dampers 19, which may be pivoted as at 20 and arranged so as to be separately operable with respect to each other. Adjacent the inner walls 10, but separated therefrom, are suitably secured a number of deflector plates 21, the lower one of which is joined to a dust duct 22 which leads down into the hopper 11. An air outlet 23, provided at the top of the collector, is adapted for the removal of the air after cleaning.

In the horizontal type of collector shown in Figs. 3 and 4 sides 26 are shown sloping and inlet duct 27 and outlet duct 28 are provided. A number of hoppers 29 may be provided and the removal of the dust may be effected by screw conveyors 30. A number of troughs 31 are suitably secured in floor 32 and in supporting plates 33 positioned near the top of the container. Troughs 31 are preferably V-shaped and may have downwardly projecting plates 34 in the dihedral angle formed by the sides and spaced from each other but arranged to leave openings 35 near the bases to permit a down flow of dust in the angles. Troughs 31 are spaced from each other so as to provide air passages between them for the passage of air from inlet 27 through outlet 28.

In operation the dustladen air or gas enters the collector at 13 in the upflow type, passes around tube portions 16 and upward through the passageways separating funnels 15 and between them and deflector 21, and the clarified air passes out through outlet 23. The air passing the funnels and deflectors is put into circular or eddy current motion which results in the dust being deposited into the funnels through which it falls and is collected in hopper 11. Dust which may collect on the floor 17 is deposited in the hopper by the tipping of the dampers 19, one at a time, which makes possible the cleaning of the floor without interrupting the operation of the collector.

In the modified type shown in Figs. 3 and 4 the air in passing the troughs 31 sets up circular currents which result in the dust being deposited on the interior of the angles, and the projecting plates 34 assist in entrapping the dust which is dropped into hoppers 29 through space 35.

We claim:

1. A dust collector, comprising, in combination, a chamber having a floor provided with a plurality of dampers, openings between said dampers, a hopper beneath said floor, an inlet and outlet for a dustladen gas, and means intermediate said inlet and outlet for dust collecting, comprising a plurality of tubular members having means adjacent the upper ends thereof adapted to entrap dust from said gas, the lower ends of said tubular members extending through the openings in the said floor whereby to deposit said dust in said hopper.

2. A dust collector comprising, in combination, a chamber having a floor provided with a plurality of dampers, openings between said dampers, a hopper beneath said floor, an inlet and outlet for dustladen gas, and means comprising a plurality of channels, the upper portions thereof being flared and the lower ends terminating inside the hopper whereby to remove dust from said gas and deposit the same in said hopper.

3. A dust collector comprising, in combination, a chamber having a floor provided with a plurality of dampers, openings between said dampers, a hopper beneath said floor, an inlet and outlet for dustladen gas, means comprising a plurality of spaced tubular members having their lower ends terminating in said hopper and the upper ends flared, and a plurality of spaced angular members disposed above said tubular members whereby to intercept the path of said gas in said chamber and entrap and remove dust from the chamber and deposit the same in the hopper.

Signed at Buffington, Indiana, this second day of August, 1929.

LOUIS WILLIAM OLSON.
MERLE ARTHUR KOLB.